United States Patent [19]

Ryan et al.

[11] Patent Number: 4,916,603
[45] Date of Patent: Apr. 10, 1990

[54] DISTRIBUTED REFERENCE AND CHANGE TABLE FOR A VIRTUAL MEMORY SYSTEM

[75] Inventors: Robert P. Ryan, Marlborough; Kin L. Cheung, North Andover, both of Mass.

[73] Assignee: Wang Labortatories, Inc., Lowell, Mass.

[21] Appl. No.: 170,483

[22] Filed: Mar. 18, 1985

[51] Int. Cl.[4] .................. G06F 12/08; G06F 12/06
[52] U.S. Cl. ........................ 364/200; 364/233.8; 364/244.1; 364/254.3; 364/264; 365/230.03
[58] Field of Search ... 364/200 MS File, 900 MS File; 365/200, 230, 230.03; 371/21

[56] References Cited

U.S. PATENT DOCUMENTS

| | | | |
|---|---|---|---|
| 3,840,863 | 10/1974 | Fuqua et al. | 364/200 |
| 3,983,537 | 9/1976 | Parsons et al. | 364/200 |
| 4,042,911 | 10/1977 | Bourke et al. | 364/900 |
| 4,084,230 | 4/1978 | Matick | 364/200 |
| 4,096,568 | 6/1978 | Bennett et al. | 364/200 |
| 4,126,894 | 11/1978 | Cronshaw et al. | 364/200 |
| 4,128,875 | 12/1978 | Thurber et al. | 364/200 |
| 4,151,593 | 4/1979 | Jenkins et al. | 364/200 |
| 4,277,826 | 7/1981 | Collins et al. | 364/200 |
| 4,414,624 | 11/1983 | Summer, Jr. et al. | 364/200 |
| 4,445,170 | 4/1984 | Hughes et al. | 364/200 |
| 4,564,900 | 1/1986 | Smitt | 364/200 |
| 4,608,631 | 10/1986 | Stiffler et al. | 364/200 |
| 4,654,819 | 3/1987 | Stiffler et al. | 364/900 |
| 4,748,627 | 5/1988 | Ohsawa | 371/21 |
| 4,758,993 | 7/1988 | Takemae | 365/230 |
| 4,807,189 | 2/1989 | Pinkham et al. | 365/230 |

*Primary Examiner*—Thomas C. Lee
*Attorney, Agent, or Firm*—Michael H. Shanahan; Gordon E. Nelson

[57] ABSTRACT

A distributed reference and change table 36 for a virtual memory system 10 has a number of storage locations at least equal to the maximum number of data blocks of an associated read/write physical memory. A memory module 24 has a plurality of data words organized into n number of data blocks. The memory module includes an integral reference and change table having at least n storage locations each having at least two bits, one bit indicating the occurrence of an access (reference) to a corresponding data block and the other bit indicating if the access was a write (or change) type of access. A plurality of such memory modules are physically and electrically coupled to a common memory carrier module, each of the plurality of memory modules having an integral reference and change table.

25 Claims, 7 Drawing Sheets

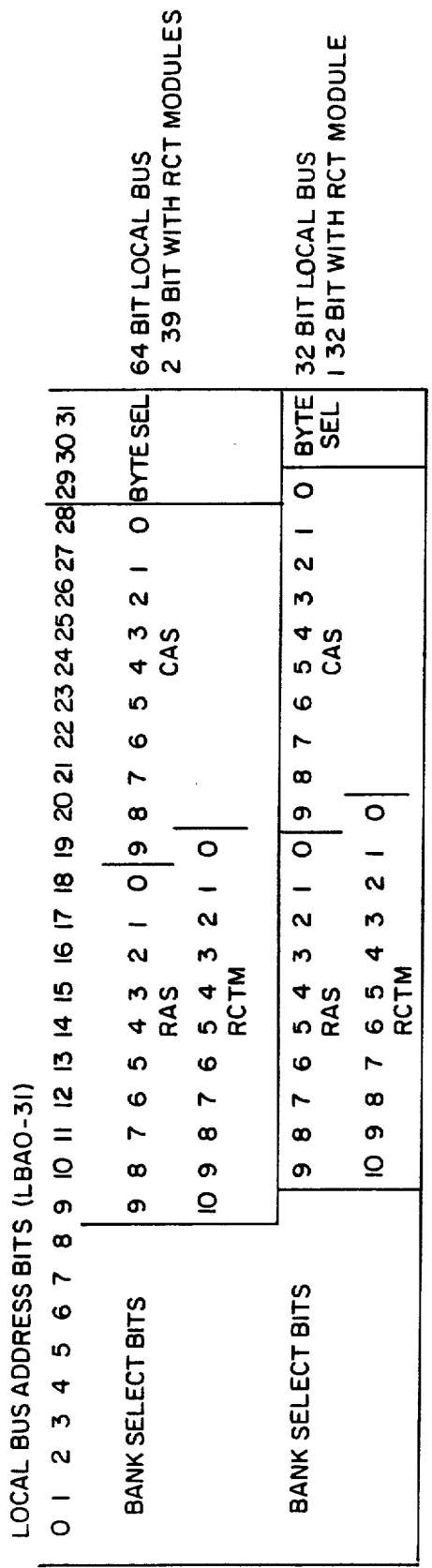
FIG. 7
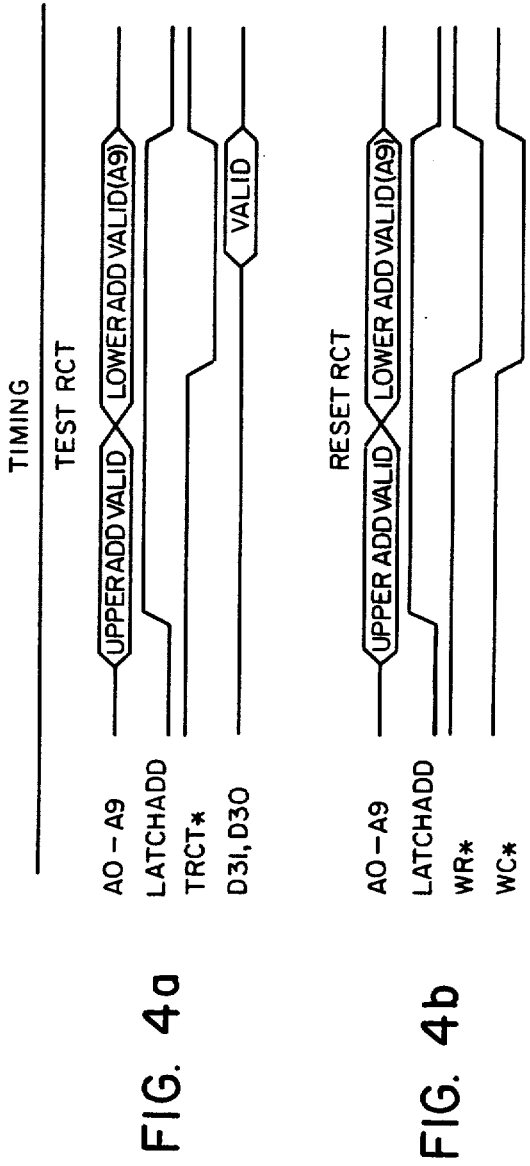
FIG. 4a
FIG. 4b

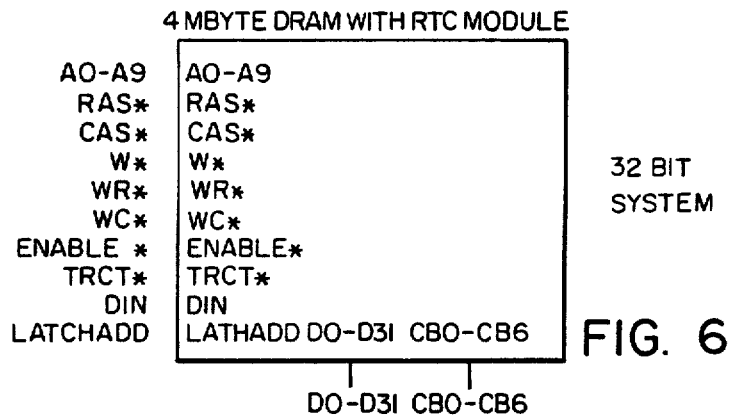
FIG. 6
FIG. 8
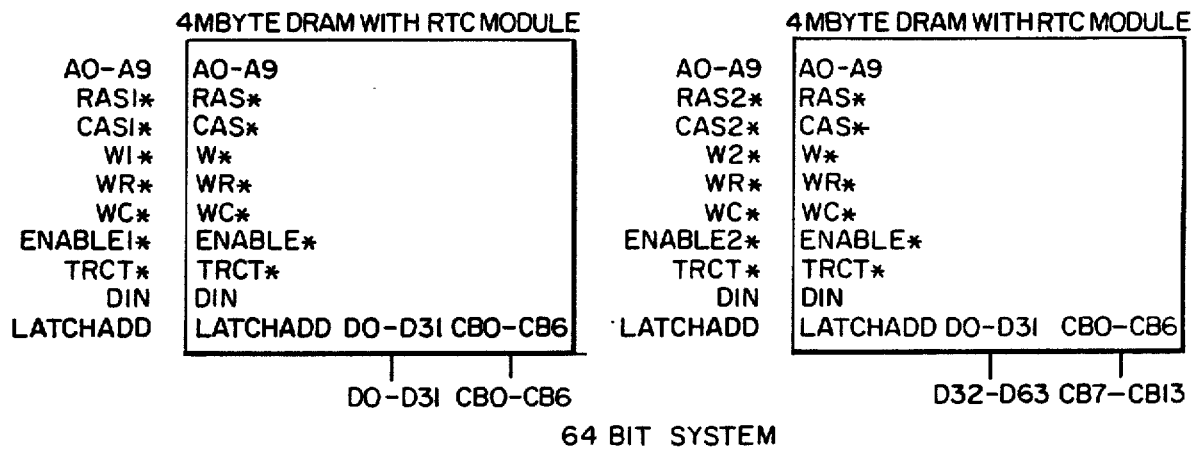
64 BIT SYSTEM
FIG. 9
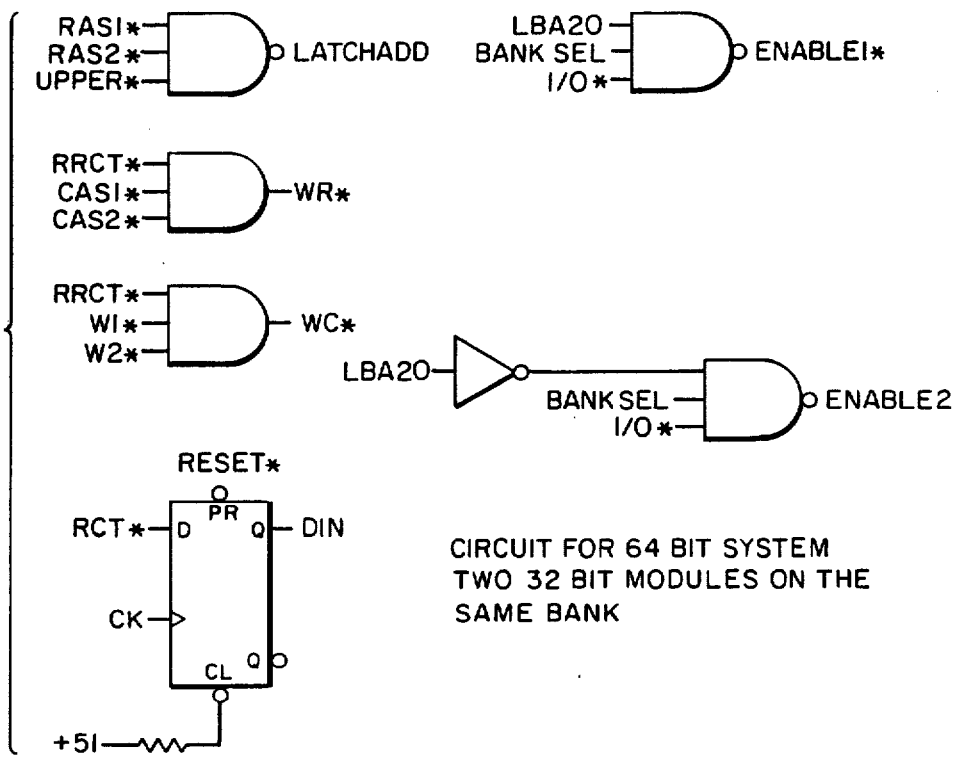
CIRCUIT FOR 64 BIT SYSTEM
TWO 32 BIT MODULES ON THE
SAME BANK

DISTRIBUTED REFERENCE AND CHANGE TABLE FOR A VIRTUAL MEMORY SYSTEM

FIELD OF THE INVENTION

This invention relates in general to digital data processing systems and, in particular, to a digital data processing system having a virtual memory.

BACKGROUND OF THE INVENTION

In a virtual memory digital data processing system a central processing unit (CPU) issues virtual memory addresses which are translated into real, or physical, memory addresses. Such a virtual memory system typically comprises a physical memory such as random access memory (RAM) typically having a number of storage locations less than the address capability of the CPU. The virtual memory system also typically comprises a mass storage system such as a magnetic disk or tape having a storage capacity which typically far exceeds that of the physical memory size, and also a virtual memory control mechanism. The virtual memory control mechanism typically comprises circuitry adapted for translating a CPU generated virtual address into a physical memory address, circuitry adapted for determining if the data addressed by the CPU is currently resident in the physical memory and circuitry adapted for suspending a CPU access until the desired data can be retrieved from the mass storage device and stored in the physical memory. Data retrieved from the mass storage device and stored in physical memory may also be subsequentially rerecorded within the mass storage device. The data transferred between mass storage and physical memory is typically organized into blocks of data having, for a particular data processing system, a predetermined format. One format is that of a variable data length segment. Another format is that of a fixed data length page. A still further format is a hybrid segment/page type of data block.

In any type of virtual memory data processing system a desired feature is that the limited and valuable resources of the physical memory be efficiently utilized. Inasmuch as a CPU access to data resident in physical memory may occur at least an order of magnitude faster than an access to data which is not resident in physical memory and which must therefore be retrieved from the mass storage device, it can be appreciated that the continued residency of appropriate data within the physical memory is a important concern. Another important concern is that data which is modified by the CPU, while resident in physical memory, be accurately rerecorded into the mass storage device. In order to accomplish these important goals it has been known to provide the virtual memory control mechanism with circuitry adapted for recording both the occurrence of a CPU access to a particular block of data in physical memory and also whether the data was modified by a write type of access. Such circuitry may be referred to as a reference and change table (RCT) and typically comprises a memory device having a predetermined number of storage locations for recording the occurrence of a CPU access to a particular data block and whether the access was a write type of access.

One particular problem with conventional RCTs is that they are embodied in a single logical element or a plurality of logical elements and are typically disposed within the virtual memory control system. These centralized RCTs typically have a fixed storage capacity which may represent a storage capacity substantially equal to the maximum virtual address capability of the CPU. For example, if the CPU has 24 address bits, the upper eight bits may define a particular page of data within virtual memory while the lower 16 bits may represent an index into the page of virtual memory. Such a CPU would therefore have a virtual memory space organized as 256 pages each comprising 65,536 memory locations. The RCT would consequently be required to have, for example, 256 memory locations (one for each page). However, if the data processing system only has the equivalent of 16 pages of physical memory installed, it can be appreciated that additional system cost, represented at least by the unused capacity of the RCT, has been needlessly incurred. Inasmuch as many modern CPUs, which typically comprise a microprocessor device, have a virtual memory addressing capability of hundreds of megabytes of data or more, the required storage capacity of an associated centralized RCT may be unacceptably large. Even if, for a given system, the RCT has a fixed, smaller storage capacity than the maximum virtual memory address capability of the CPU the RCT capacity may still need to be made larger than necessary in order to accommodate projected increases in system memory capacity. The fixed storage capacity of such a reduced capacity RCT may then substantially prove disadvantageous if it is desired to increase the system storage capacity beyond the originally designed capacity, such as by attaching additional memory modules to the system. The fixed size of the RCT thus imposes a maximum limit on the virtual and physical memory space of the system.

It is therefore one object of the invention to provide a system RCT of variable storage capacity.

It is a further object of the invention to provide a modular RCT which is physically distributed throughout the physical memory space of a virtual memory data processing system.

It is one still further object of the invention to provide a modular, distributed RCT for a virtual memory data processing system which readily accommodates the expansion of the virtual memory space up to the maximum addressing capability of the data processing system CPU.

It is also an object of the invention to provide a memory module adapted for being attached to a virtual memory data processing system which comprises an integral RCT having a storage capacity equal to the number of virtual memory data blocks which may be stored within the memory module.

It is a still further object of the invention to provide a memory carrier module adapted for being coupled to a virtual memory data processing system and having one or more memory modules disposed thereon, each of the memory modules having an integral RCT.

SUMMARY OF THE INVENTION

The foregoing problems are overcome and the objects of the invention are met by a modular, distributed reference and change table which comprises a reference and change table storage device for recording an occurrence of an access and a type of access to a specific address location within a memory, the memory being organized into a predetermined number n of blocks each comprising a plurality of memory address locations. The memory is disposed upon a memory module operably coupled to a data processing system bus, the reference and change table storage device also being disposed upon the memory module and also operably coupled to the data processing system bus.

The reference and change table storage device comprises circuitry for storing data, the data storing circuitry having a number of storage locatins at least equal to n; circuitry for determining which block of the n blocks is accessed; circuitry, responsive to the operation of the determining means, for storing data at a specific storage location within the data storing circuit wherein the specific storage location corresponds to the number of the accessed block. The stored data is indicative of at least the occurrence of the access to the block and also if the access was a data write type of access. The reference and change table storage device also comprises circuitry, responsive to a first type of access by a data processing system, for outputting to the data processing system bus a content of a specific location within the data storing circuitry. The reference and change table storage device further comprises circuitry, responsive to a second type of access by the data processing system, for resetting a specific storage location within the data storing circuit to indicate, for the corresponding block, a nonaccessed condition.

Also in accordance with the invention there is disclosed a memory module having a plurality of read/write memories and a reference and change table, disposed upon the memory module, for indicating the reference and change status of individual blocks of memory locations within the memories. There is further disclosed a memory unit comprised of a memory carrier module having one or more memory modules disposed thereon. In accordance with the invention, the reference and change table is distributed throughout the physical memory space of the virtual memory system inasmuch as each memory module comprises an associated reference and change table having a storage capacity at least equal to the number of blocks of physical memory represented by the memory module.

BRIEF DESCRIPTION OF THE DRAWINGS

These and other aspects of the invention will be made more apparent hereinafter in the Detailed Description of the Invention read in conjunction with the accompanying drawing, wherein:

FIG. 3 is a schematic diagram showing one embodiment of circuitry operable for implementing the RCT of FIG. 2a;

FIGS. 4a and 4b are timing diagrams which illustrate the operation of the circuitry of FIG. 3;

FIG. 6 is a block diagram of a 32 data bit memory module showing a portion of the signal lines coupled thereto;

FIG. 7 is a graph showing the allocation of address bits for a 32 bit data word and for a 64 bit data word;

FIG. 8 is a block diagram showing two of the memory modules of FIG. 7 for use in a 64 data bit data processing system; and FIG. 9 shows one embodiment of circuitry operable for implementing the 64 bit system of FIG. 8.

DETAILED DESCRIPTION OF THE INVENTION

Figure 1:
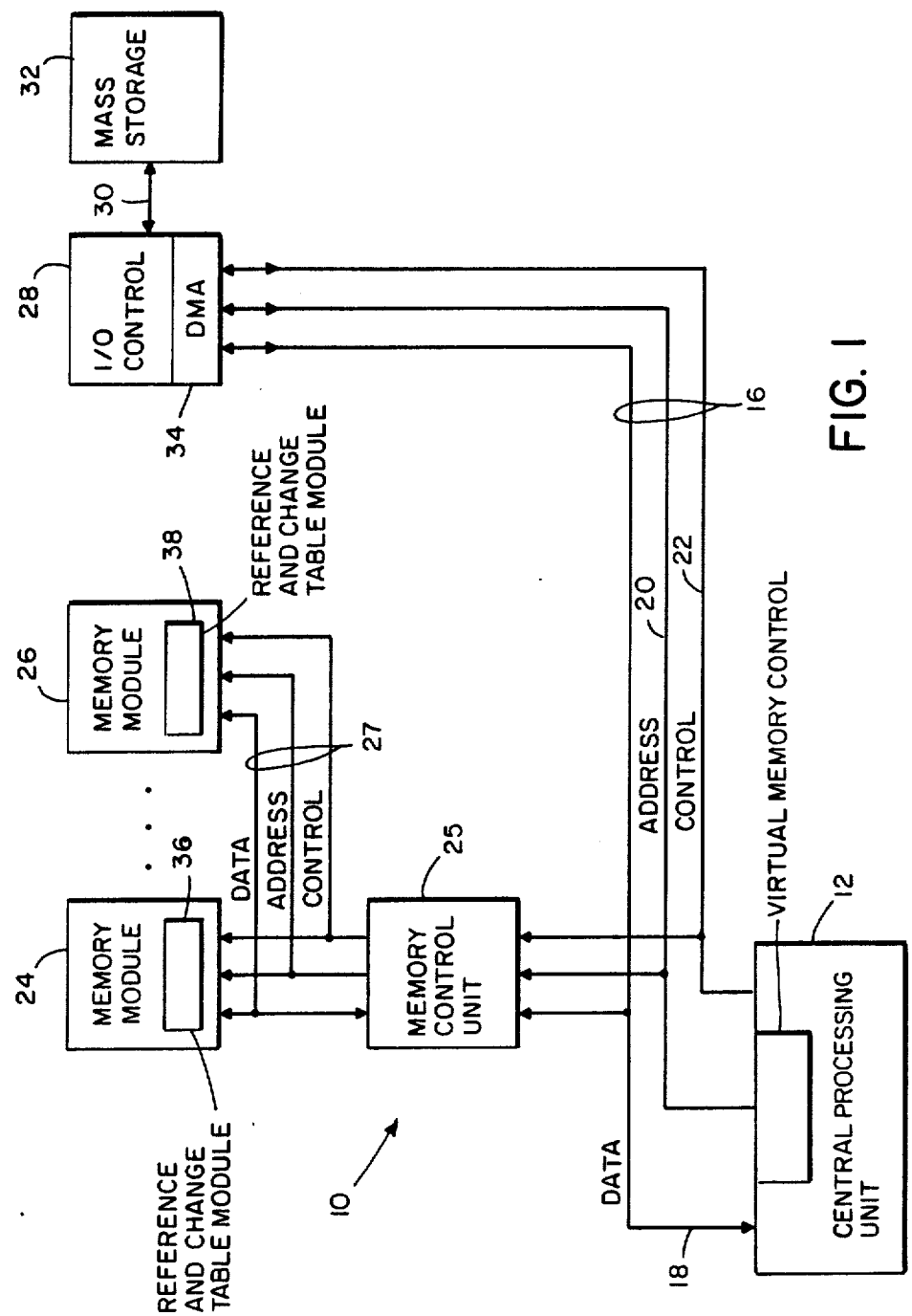
FIG. 1 is a block diagram of an illustrative virtual memory data processing system having a modular reference and change table distributed over a plurality of memory modules.

Referring now to FIG. 1 there is shown in block diagram form a virtual memory data processing system 10 comprised of a central processing unit (CPU) 12 having a virtual memory control (VMC) 14. CPU 12 is coupled to a system bus 16 which comprises a plurality of groups of signal lines, such as a bidirectional data bus signal line group 18, an address bus signal line group 20 and a control signal line group 22. Data bus signal group 18 is organized in byte fashion and may comprise, for example, 32 or 64 bidirectional signal lines for coupling data between the CPU 12 and a first memory unit, or module 24, a second memory module 26, and an I/O control 28. The data bus signal group 18 may also comprise additional bits related to the operation of an error detection and correction circuit (EDAC), not shown. The EDAC is typically disposed within CPU 12 or VMC 14. Also coupled to modules 24, 26 and 28 are the address bus 20 and control bus 22. Of course, the system 10 may comprise either less than or more than the two memory modules 24 and 26.

In a preferred embodiment of the invention memory modules 24 and 26 are coupled to CPU 12 through a memory control unit (MCU) 25 via a memory bus 27. MCU 25 in the preferred embodiment performs memory timing, selection, control and refresh functions; such as multiplexing the address bus 20 into memory row and column addresses and asserting row and column address strobe signals.

Address bus 20 is output by VMC 14, the logicial state of the address bus 20 being expressive of a physical address within, for example, one of the memory modules 24 or 26. VMC 14 is operable for translating a virtual memory address generated by CPU 12 into a physical memory address. Control bus 22 typically comprises memory and I/O read and write signal lines and other signal lines such as lines expressive of bus error conditions, bus arbitration states and bus timing and synchronization.

I/O control 28 may be coupled via a bus 30 to an I/O device such as a data communications port or, as illustrated, to a mass storage unit 32 which may comprise a rotating magnetic disk, a magnetic tape or any other storage device operable for storing data and computer program instructions. I/O control 28 may also comprise a direct memory access (DMA) circuit 34 which is operable for directly transferring data to and from the mass storage unit 32 and memory locations within either the memory module 24 or 26. Movement of data between mass storage unit 32 and memory is typically characterized as an I/O type of memory access as opposed to a CPU 12 memory access. As such, control bus 22 comprises an I/O signal line which is indicative of whether a given memory access is an I/O access. Of course, in some systems the DMA 34 may be physically located within the CPU 12.

In accordance with the invention, each of the memory modules 24 and 26 comprise a memory reference and change table module (RCTM) 36 and 38, respectively.

Figure 2A:
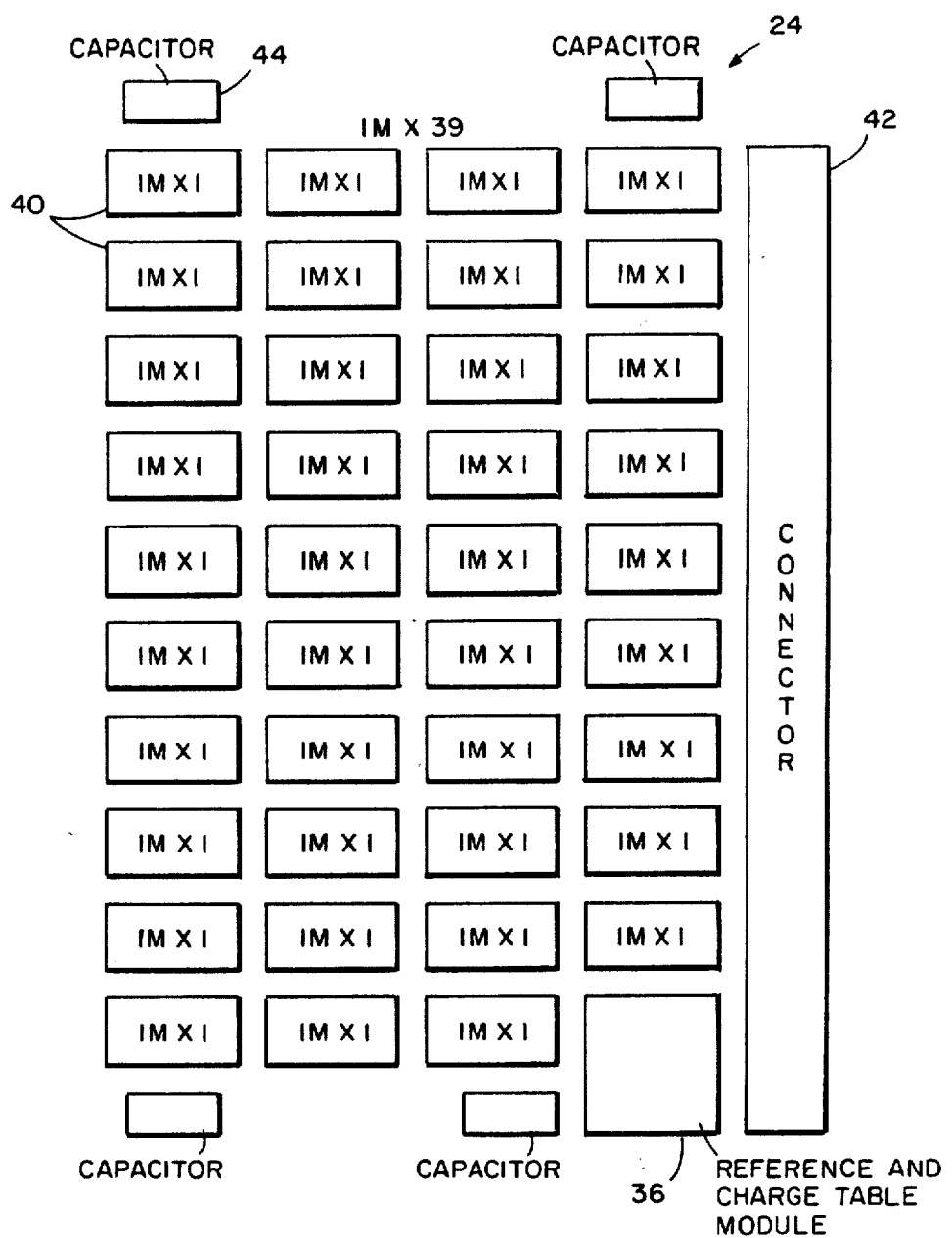
FIG. 2a is a block diagram showing one of the memory modules of FIG. 1, the memory module having an integral RCT in accordance with one aspect of the invention.

Referring now to FIG. 2a there is shown in block diagram form one of the memory modules of FIG. 1, specifically, the memory module 24. As can be seen, memory module 24 comprises a plurality of memory devices 40, which in an illustrative embodiment of the invention are each dynamic random access memory (DRAM). In the embodiment shown in FIG. 2a the memory module 24 comprises 39 DRAM devices, each of which is operable for storing approximately one million bits of information. There are 39 DRAM devices 40 illustrated, 32 of which store program instructions or data, that is, four eight-bit bytes of program instructions or data. The remaining seven DRAM devices store error detection and correction bits which are utilized to detect double bit and correct single bit data errors which may occur within the DRAM devices 40. These seven error detection and correction bits are optional and may not be utilized in some systems. The memory module 24 may also comprise a connector 42 which is operable for coupling a plurality of digital signals from, for example, the bus 27 to the memory module 24. These signals include operating power (+5 V and 0 V), a plurality of multiplexed address lines (A0-A9), a plurality of data lines (D0-D31 or D0-D63), the error detection and correction data bits (CB0-CB6), and a plurality of memory control signal lines (RAS*, CAS*, W*). The memory module 24 also comprises the aforementioned RCTM 36, which is also coupled to certain of the signal lines (A0-A9, RAS*, CAS*, W*i, RRCT*, TRCT*, I/O and UPPER) in a manner which will be disclosed below.

The memory module 24 also comprises a substrate, which may be a printed circuit card of well known construction having the plurality of memory devices soldered or otherwise coupled thereto, including the RCTM 36 and other components such as power supply filtering capacitors 44. In this regard, RCTM 36 may be comprised of a plurality of discrete logic devices coupled together as will be described. Preferably, RCTM 36 is a unitary integrated circuit device, such as a gate array, which achieves a lower power consumption and a lower surface area utilization than a plurality of devices.

It should be appreciated that the modular RCTM of the invention is not limited to being employed upon discrete memory modules coupled to a system bus. For example, in some systems it may be desirable to provide one unitary substrate having all of the system components physically mounted thereon. In such a system one or more memory units would be attached to the substrate along with a data processor, a system bus, VMC and other components. Each memory unit may then be associated with one of the modular RCTMs. In such a unitary system it may not be a requirement that the RCTMS be physically adjacent the memory units but may instead be physically separated therefrom. However, the RCTMs would be coupled to the appropriate signal lines for recording the reference and change status of an associated memory unit, such as a four megabyte unit.

The memory module shown in FIG. 2a is capable of storing in excess of four megabytes of data, or one megaword, each word being comprised of 32 bits of data. It can be appreciated that two such modules may be operated in parallel to store words having 64 bits of data, four modules may store words having 128 bits of data, etc.

Figure 2B:
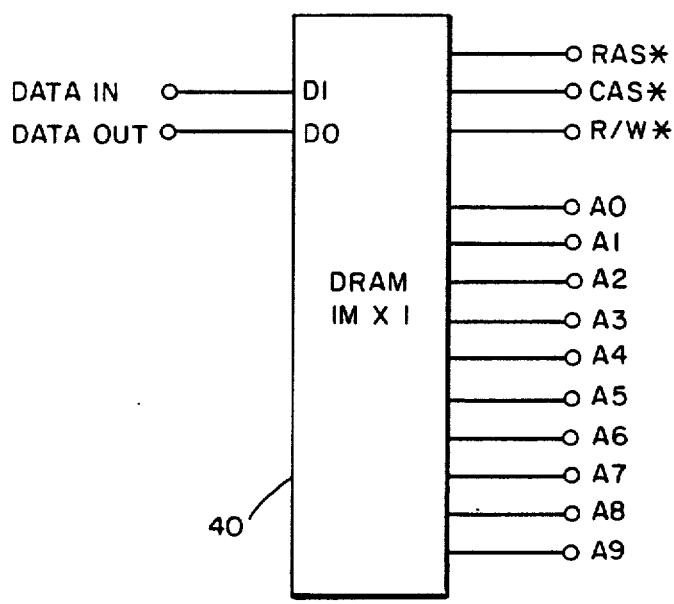
FIG. 2b is a block diagram showing a representative one of the memories 40.
Figure 2C:
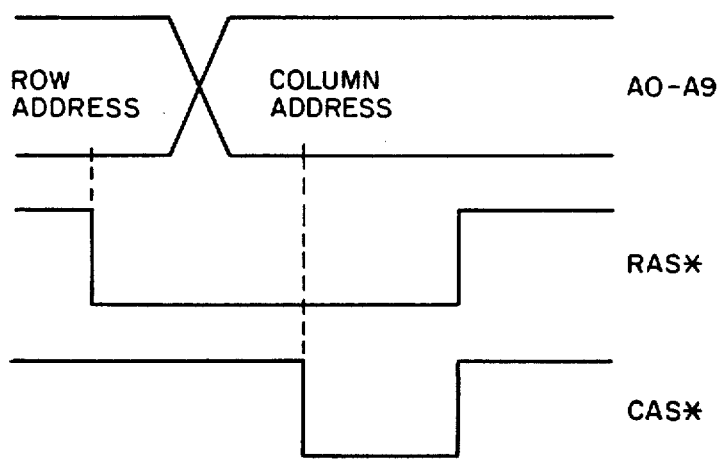
FIG. 2c is a representative timing diagram showing the operation of RAS* and CAS* for the memory 40 of FIG. 2b.

Referring now to FIGS. 2b and 2c there is shown a well known DRAM having a Data In and a Data Out signal line and a plurality of address lines A0 through A9. the DRAM 40 also has a RAS*, CAS*, and R/W* signal control line. In order to achieve a large data storage device with a minimum of input signal pins and, hence, a small package size, such DRAMs typically multiplex the address lines such that at one time in the operation of the device the address lines are characterized as row address lines under the control of RAS* and at another time in the cycle are characterized as column address lines under the control of CAS*. The device shown in FIG. 2b has ten address signal pins and, thus, has a total of 20 address inputs which yield a device having a total of 1,048,567 bit storage locations. Of course, other DRAMs may have more or less than ten address inputs such as 64K and 256k bit devices and other devices may store more than one bit of data, such as devices adapted to simultaneously store and retrieve four bits of data.

As shown in FIG. 2c one conventional addressing mode for such a DRAM results in Ras* being asserted for latching within the RAM the row address lines appearing on A0-A9. Subsequent to the assertion of Ras* the state of the address lines A0-A9 are switched to the desired column address and Cas* is asserted. The assertion of Cas* also typically either stores within the device of reads from the device, depending upon the state of R/W*, a bit of data at the specified row and column address.

Figure 3:
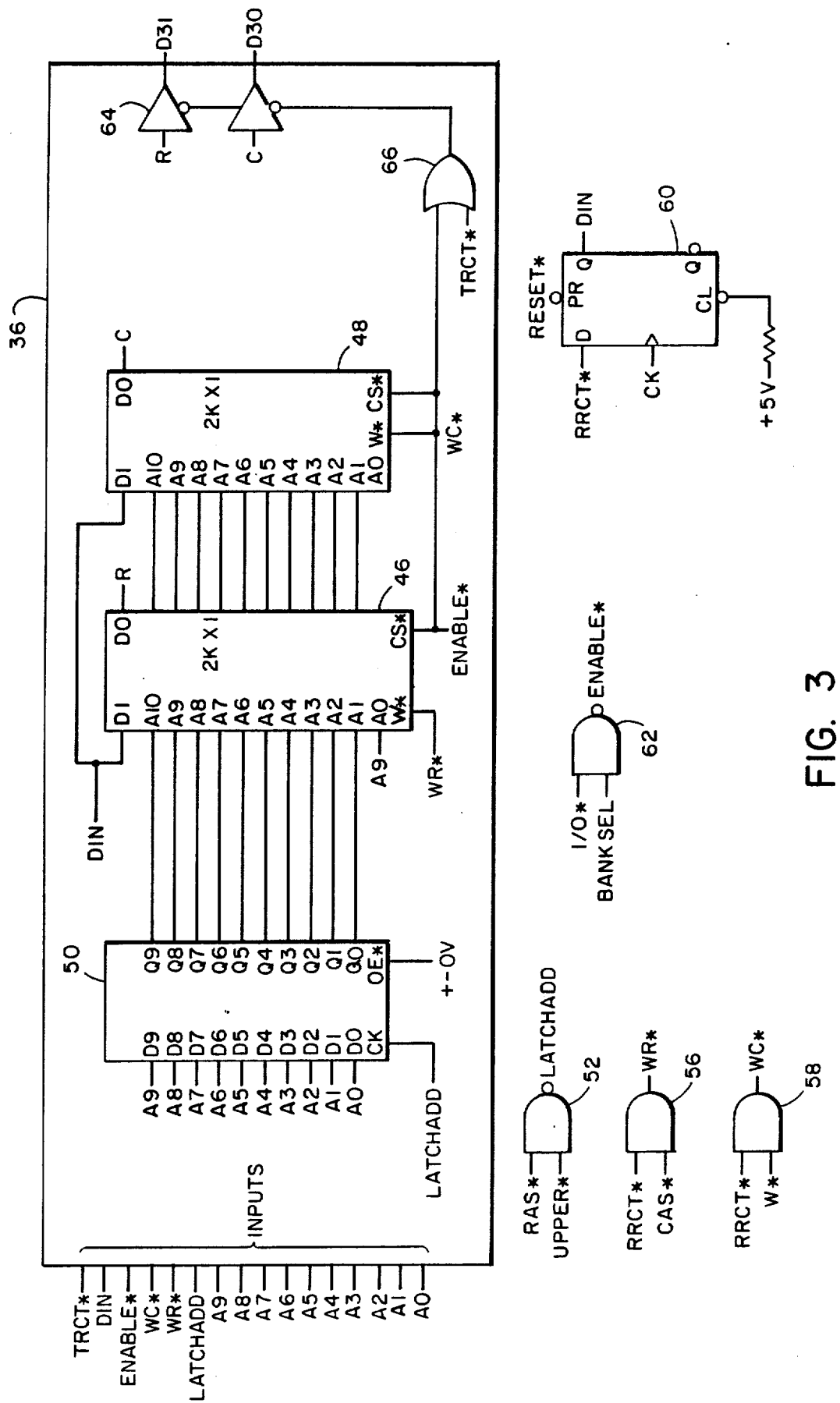

Referring now to FIG. 3, in conjunctin with FIGS. 4a and 4b, there is shown an illustrative schematic diagram of the RCTM 36 of FIG. 2a and timing diagrams which illustrate the operation of the RCTM. RCTM 36 can be seen to comprise a first memory device 46 and a second memory device 48. Memory devices 46 and 48 each have, in this embodiment of the invention, storage capacity of 2048 bits of data. The 2048 bit storage capacity of each of the memory devices 46 and 48 corresponds to 2048 blocks, or page frames, of physical memory; that is 2048 page frames each comprising 512 32 bit words of data. Memory device 46 is configured such that an access by CPU 12 to the memory device 40 on the memory module 24 results in a corresponding bit being set to a logic one condition. Memory device 48 is configured such that a write access to a memory device upon the memory module also results in a corresponding bit being set to a logic one. Thus, it can be seen that memory device 46 records the occurrence of a reference to a particular page of data while memory device 48 further records the occurrence of a write, or change, of a particular page of data.

In order to accomplish these functions memory devices 46 and 48 have 11 address inputs (A0-A10). A1-A10 are coupled to the output of a ten bit latch 50 which latches the state of the A0-A9 address bits from the address bus 20. This latching function may be accomplished by the falling edge of the memory row address strobe (RAS*). The falling edge of RAS* occurs during the strobing of the row address into the memory devices 40 of FIG. 2a. RAS* is applied to a clock input of latch 50 via NAND gate 52. A second input to NAND gate 52 is a normally high signal UPPER*, the operation of which will be described hereinafter. The eleventh address input to memory devices 46 and 48 is subsequently applied after the falling edge of RAS*, being the A9 address signal, which is typically applied during the column address strobe (CAS) portion of the memory 40 access cycle. Thus, it can be seen that the address appearing on the 11 address inputs to memory devices 46 and 48 defines one page of 2048 pages of physical memory installed upon the module, the address inputs being decoded by an address decoding means which comprises at least circuitry within the memory devices 46 and 48.

It should be noted that the presently preferred embodiment of a memory module described herein comprises, as illustrated in FIG. 6, 1,048,576 data words each comprising 32 bits of data, for a memory module storage capacity of more than four million bytes of data. In other embodiments of the invention the memory module may comprise more or less than this number of data storage locations. The memory devices 46 and 48 in these other, unillustrated, embodiments will correspondingly have fewer or more storage locations. Also, if a page frame of data is defined to be other than 512 data words, such as 256 or 1024 data words, the storage capacity of each of the memoy devices 46 and 48 may also differ from that shown herein. It should also be noted that the presently preferred embodiment of the invention is shown to utilize dynamic random access memory, such memories typically requiring the RAS* and CAS* timing signals. However, in other unillustrated embodiments of the invention the memory devices 40 may be static type memory devices which do not require RAS* and CAS* timing signals. In general, any type of memory device, such as bubble memory, may be utilized upon a memory module 24 or 26.

Coupled to a write input (W*) of memory device 46 is an AND gate 56 having as inputs the CAS* memory timing signal and a read reference and change table (RRCT*) signal, the operation of which will be described hereinafter. At the completion of the CAS* portion of the memory cycle the logic state appearing at the data input (DI) of memory device 46 will be stored within the location addressed by the state of address line A0-A10. The DI input of memory device 46 is coupled to the output of a flip/flop (FF) 60 which has a Read Reference and Change Table (RRCT*) signal coupled to a D input thereof and a clock signal coupled to the clock input. During normal memory accesses RRCT* is a logic one; making DIN normally a logic one. Thus, a logic one is stored within the memory device 46 at a location corresponding to the page frame addressed by CPU 12. The storage of such a logic one signal is indicative of a reference to a particular page fame by the CPU 12.

Memory device 48 is similarly coupled to the address signals and the output of FF 60 and, further, has an AND gate 58 coupled to the W* thereof, the AND gate 58 having as inputs the memory write (W*) timing signal and the RRCT* timing signal. The state of the W* timing signal is indicative of a CPU 12 write access to the memories 40 of memory module 24. The assertion of W* stores a logic one in the memory location addressed by address inputs A0-A10 of memory device 48. This is indicative of a change to the corresponding page frame of physical memory. During a CPU 12 read access the W* signal line is not asserted. Thus, only the corresponding bit in memory device 46 is set. Only during a CPU 12 write access to a particular page of physical memory are both the reference and change bits set in devices 46 and 48, respectively.

Memory devices 46 and 48 each have a chip select input (CS*) which is normally required to be at a logic low state in order to read or write data within the memory device. The CS* signals of memory devices 46 and 48 are coupled, via NAND gate 62, to an active low signal I/O*, which is normally at a logic zero state and to an active high bank select (BANK SEL) signal. During a CPU 12 access to the memories 40 memory devices 46 and 48 are enabled for accesses by the I/O* signal being high, or deasserted. The BANK SEL input to NAND gate 62 is high when the bank of memory associated with RCT 36 is selected. The combination of I/O* being deasserted, or high, and BANK SEL being asserted drives the output of NAND gate 62 low, thereby selecting both memory devices 46 and 48.

As can be seen in FIG. 7 a 32 bit local address bus has, for a 32 bit data bus embodiment, ten MSB bits as bank select addresses. A 64 bit data bus system has nine MSB address bus bits as bank select addresses. It can be appreciated that a 32 data bit system comprises four bytes of data per word while a 64 data bit system comprises eight bytes of data per word. Byte selection is accomplished by decoding either two or three LSB address bits. Such bank and byte select decoding is typically accomplished by address decoding means within the MCU 25.

The I/O* signal is provided to prevent the operation of memory devices 46 and 48 during an I/O type of memory 40 access, such as when the I/O controller 28 is storing or retrieving data within the memories 40.

It can be appreciated that in order to be useful the information stored within memory devices 46 and 48 must be operable for at least being read and possibly modified by a physical memory controlling device, such as a software routine executed by the CPU 12 which manages the physical memory. For example, it may be desirable after a predetermined interval of time to examine the memory device 46 to determine which pages of memory have been accessed by CPU 12 and which pages have not been accessed. If, after a given interval of time, one or more pages of data have not been accessed by CPU 12 the continued residency of these pages of data within the physical memory may be unnecessary. Thus, it may be desirable to some situations to remove any unreferenced page of data from memory and to store in its place another page of data, such as a page of memory which is currently being requested by the CPU 12. It may also be desirable at this time to determine if the page of data has been changed by the CPU 12 during a memory write cycle. If it is determined that a page of data which is to be removed from the physical memory has been changed it may further be desirable to store the changed data on the mass storage device 32. If the page of data has not been changed, whether it has been referenced or not, the restorage of the data is usually unnecessary. That is, new data may be written over the current data within the page without having to first store the currently resident data within mass storage 32, it being assumed that a copy of the page exists within the mass storage device 32.

In order to accomplish these desirable functions the RCTM 36 is operable for having individual bits of the memory devices 46 and 48 selectively reset to a logic zero condition. This is accomplished by asserting the reset reference and change table (RRCT*) signal in conjunction with the desired address of the page within the memory devices 46 and 48. As can be seen in FIG.

3 and 4b, when RRCT* is low, or asserted, the data input (DIN) to each of the memory devices 46 and 48 is at a logic zero condition via F/F 60. The assertion of RRCT*, being coupled through AND gates 56 and 58 to the write inputs of memory devices 46 and 48, respectively, causes a logic zero to be written into the addressed memory location. The address inputs A0-A9 are first set up as previously described, the address bits being latched into latch 50 by the assertion of signal UPPER*. The resetting of bits within memory devices 46 and 48 is accomplished, for example, when a new block of data is stored within the physical memory.

In order to read the reference and change table data the RCTM 36 is provided with a test reference and change table (TRCT*) signal. Data read out of memory devices 46 and 48, as determined by address inputs A0-A10, is provided to a buffer 64 which has as inputs the signals R (reference) and C (change) which are supplied from the data out (DO) outputs of memory devices 46 and 48, respectively. The TRCT* signal is provided, via OR gate 66, to an output enable (OE*) input of buffer 64 to cause the buffer 64 to place the logic states of R and C on a pair of outputs coupled to the most significant bit (MSB) and the second most significant bit (MSB-1) of the data bus. Thus, the CPU 12 is enabled to read the addressed location within memory devices 46 and 48 to determine the reference and change status of the corresponding page of physical memory. Preferably, these accesses to RCTM 36, as defined by TRCT* and RRCT*, are not memory-type accesses to prevent the storage of reference and change bits within memory devices 46 and 48.

Based upon the foregoing description it can be appreciated that the use of the invention provides several valuable advantages in a virtual memory data processing system. For example, the reference and change table is not centralized nor need it be physically adjacent the CPU 12 or the VMC 14. Instead, the RCT is distributed throughout the physical memory space of the data processing system 10. Thus, additional memory modules may be attached to the system, each of the memory modules having an internal, modular RCTM for recording the reference and change activity upon that particular memory module. The data processing system may have its physical memory capacity expanded without exceeding the storage capability of any one particular RCTM. Also, the virtual memory data processing system 10 is not burdened with excess cost and complexity by having a unitary reference and change table which has a predetermined storage capacity which far exceeds the actual physical memory storage capacity of the system.

In summary, the virtual memory data processing system 10 is provided with a flexible and expandable reference and change table which is expanded as physical memory capacity is attached to the system, thereby providing for a reduction in system cost and the readily accomplished memory expansion of the system. Such a readily accomplished memory expansion is especially advantageous for those systems which have their physical memory capacity increased at a time subsequent to the initial installation of the system. In other words, the system reference and change table is automatically expanded during the installation of one or more additional memory modules.

Figure 5:
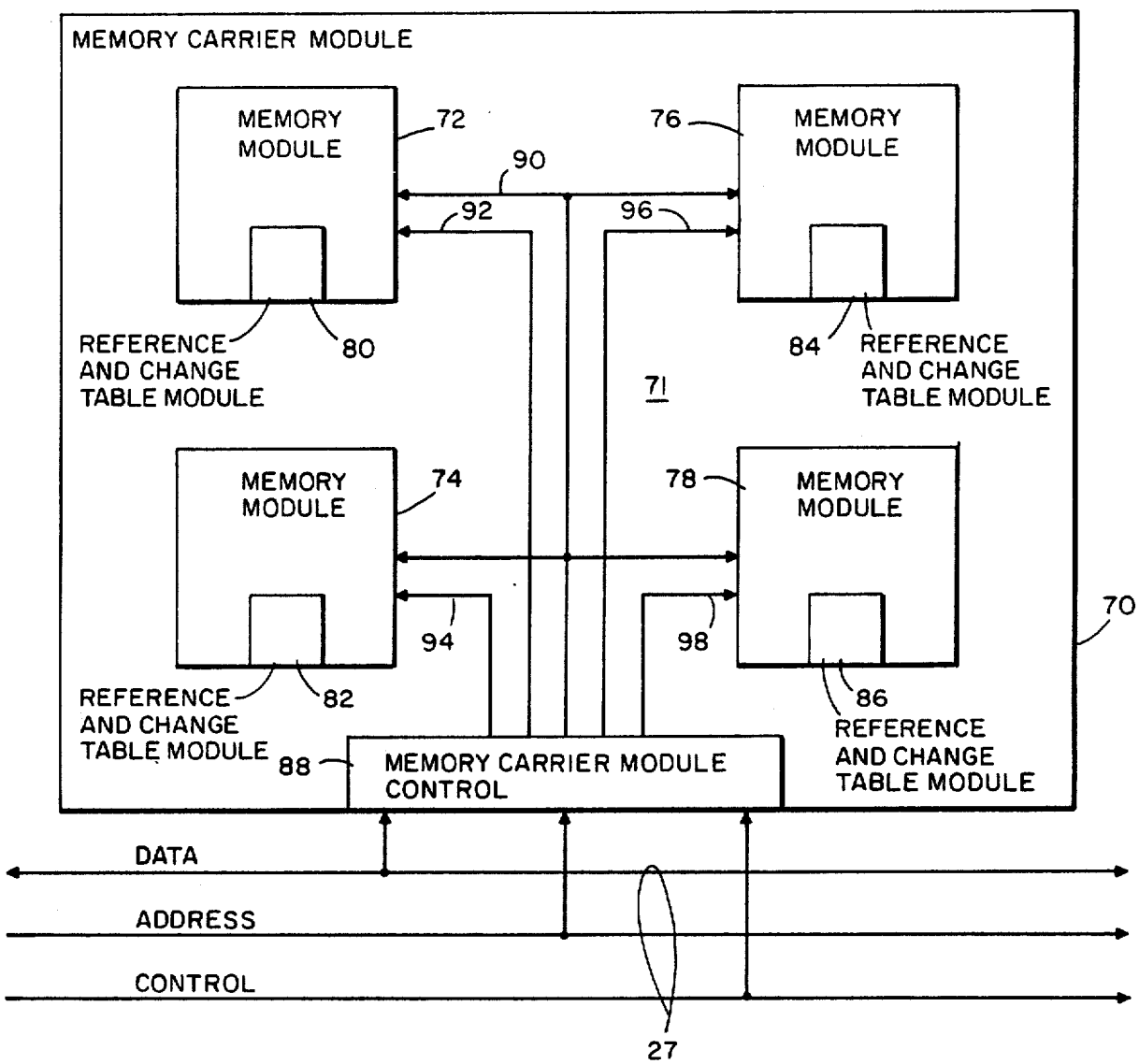
FIG. 5 is a block diagram showing a plurality of the memory modules of FIG. 2a, each having an integral reference and change table, each being disposed upon a common memory carrier module.

Referring to FIG. 5 there is shon a memory carrier module (MCM) 70 which, in accordance with the invention, comprises a substrate, such as a printed circuit board, having a plurality of memory modules (MM) 72-78 disposed upon a surface 71 thereof. Each of the MMs 72-78 may be identical in construction to the memory module 24 of FIG. 2a, that is, each of the MMs 72-78 comprises an integral reference and change table module (RCTM) 80-86, respectively. Each of the RCTMs 80-86 may be identical in construction to the RCTM 36 of FIG. 3. It should be realized that more or less than the four MMs shown may be provided on the MCM and that less than the possible maximum number may be installed at any given time. MCM 70 may comprise logic means, such as a memory carrier module control (MCM CONTROL) 88, which is operable for interfacing with the memory bus 27. In operation, MCM CONTROL 88 decodes the address and control buses to select a particular MM 72-78 for read or write access by the CPU 12 or I/O control 28. MCM CONTROL 88 may also be operable for generating the multiplexed row and column address signals on A0-A9, the RAS* and CAS* signals, and the logic signals associated with the RCTMs 80-86, such as RRCT*, TRCT* and UPPER. It can be appreciated that MCM control 88 may comprise a well-known DRAM controller type of device and other circuits, such as address decoders, and row and column address multiplexers. Of course, these MCM control functions may also be accomplished by the MCU 25 of FIG. 1, either operating alone or in conjunction with MCM control 88.

In order to activate only one of the MMs 72-78 MCM CONTROL 88 may have a number of CAS* outputs equal to the numbers of MMs installed, only one of the CAS* outputs being asserted for any given CPU 12 or I/O access. Similarly, the MCM CONTROL 88 may have a plurality of RRCT* and TRCT* outputs for individually activating the RCTMs 80-86.

That is, MCM CONTROL 88 may be operable for generating a common MM signal group 90 which includes those logic signals, such as A0-A9, UPPER, and RAS* which are provided in common to each of the MMs. MCM CONTROL 88 may further be operable for generating a plurality of MM specific signal groups 92-96, coupled to MMs 72-76, respectively. Each specific signal group is comprised of signals operable for activating only a selected MM, such as CAS*, W*, RRCT*, I/O and TRCT*.

For the illustrative MCM 70 of FIG. 5 the total storage capacity of the MCM 70 may vary from four megabytes to 16 megabytes of data, depending on the number of MMs installed. The total RCTM storage capacity therefore is similarly variable between 2048 and 8192 two bit words of data, corresponding to the total number of physical page frames represented by the installed memory capacity of MCM 70.

The invention has been generally described thus far in the context of a system having a 32 bit data word. It should be realized however that the RCTM of the invention is not limited to use with 32 bit systems. Each memory module 72-78 may comprise of 16 memory devices and a corresponding fewer number of error detection and correction memory devices coupled to a 16 bit data bus. In some systems however it may be desirable to employ an expanded data path, such as a data path comprised of 64 or 128 bits. A 64 bit system is illustrated in FIG. 8. Logica operable for generating certain of the RCTM input signal is shown schematically in FIG. 9.

For example, in such an expanded system the data bus may comprise data signal lines D00-D62 coupled to the MCM 70. The 32 bit MMs 72 and 74 may then each store one half of the 64 bit data word. For example, the lower 32 bits may be stored in MM 72 and the upper 32 bits in MM 74. In such a system MCM CONTROL 88 may comprise additional circuitry for bank selecting either or both of the MMs 72 and 74 depending upon the type of CPU access. A long word (64 bit) access would result in the selection of both MM 72 and 74 while a word access (32 bits) would select only one of the MMs 72 or 74. The bank selection would not only enable the memory devices upon the selected MM but would also enable the associated RCTM. In accordance with the invention, the decoded higher order address signal line modifies the state of an MM specific signal, such as ENABLE*. For example, the I/O* signal line may be combined with a BANK SEL signal as illustrated in FIG. 3. Thus, the modular RCTM of the invention may be readily employed in a number of different types of data processing systems having varying data word widths and/or depth.

As has been previously stated, a presently preferred embodiment of the invention has been disclosed herein. It is anticipated that those having skill in this art may envision modification to this disclosed presently preferred embodiment. For example, although the RCTM is shown to comprise two separate memory devices 46 and 48, it is within the scope of the invention to provide one memory device having a storage capacity of two or more bits per address location. Thus, it is to be understood that the invention is not to be limited to this presently preferred embodiment but is instead to be limited only as defined by the appended claims.

What is claimed is:

1. Reference and change table storage means for a virtual memory data processing system for recording an occurrence of an access to and a type of access to a specific physical address location within a physical system memory means, the physical system memory means being organized into n predetermined numbers of blocks each comprising a plurality of physical memory address locations, the n predetermined numbers of blocks of the system memory means being partitioned into one or more memory units coupled to a data processing system bus wherein n is a positive integer, the data processing system bus including a physical system address bus, a system data bus and a system control bus, the reference and change table storage means comprising:

for each of the memory units means for storing data, said means for storing having a number of storage locations at least equal to a number of blocks corresponding to the memory unit;

means for determining which one of said blocks is specified for access, said determining means being coupled to said physical system address bus and responsive thereto;

means, coupled to said system control bus and responsive to an operation of said determining means, for storing data at a specific storage location within said data storing means, said specific storage location corresponding to the block specified for access, the stored data being indicative of at least the occurrence of the access to the block and also if the access was a data write type of access;

means, responsive to a first type of access by the data processing system, for outputting to predetermined signals lines of the system data bus a content of a specific storage location within said data storing means; and means, responsive to a second type of access by the data processing system, for storing data at a specific storage location within said data storing means to indicate, for the corresponding block, a nonaccessed condition.

2. Reference and change table storage means as defined in claim 1 wherein said data processing system comprises CPU means for generating virtual memory addresses for accessing a specific address location within said memory means, said data processing system further comprising virtual memory controller means coupled between said CPU means and said physical address bus for generating said physical addresses in response to virtual memory addresses generated by said CPU means, said data processing system further comprising I/O means having means for generating a physical address for accessing a specific address location within said memory means, said reference and change table storage means further comprising:

means, responsive to a memory access by said I/O means, for disabling the operation of said storing means.

3. A memory module for a data processing system comprising:

a substrate;

memory means for storing data or outputting stored data in response to an access by a data generating or a data receiving means, respectively, said memory means being disposed upon said substrate and organized into a predetermined number of data blocks, each of said blocks comprising a plurality of memory storage locations, a particular one of said blocks being defined by a logical state of a plurality of address signal lines generated during an access by said data generating or data receiving means, said address signal lines being expressive of a physical memory address generated by a virtual memory address translation means that generates said physical memory address from a virtual memory address generated by a CPU means coupled to said translation means; and data block reference and change table means disposed upon said substrate and comprising a predetermined number of storage locations at least equal in number to said predetermined number of data blocks, said table means further comprising means, responsive to the logical state of said physical memory address signal lines, for storing at a storage location number corresponding to a number of one of said data blocks, data expressive of the occurrence of an excess to and a type of access to said data block, said table means further being responsive to the logical state of said physical memory address signal lines for outputting, from a storage location corresponding to one of said data blocks to predetermined signals lines of a system data bus coupled at least to said data receiving means, data expressive of an occurrence of an access to and a type of access to one of said data blocks.

4. A memory module as defined in claim 3 wherein said data generating and said data receiving means comprises said CPU means, and wherein said date generating and said data receiving means further comprises I/O controller means for transferring data to and from an I/O device and said memory means, and wherein said reference and change table means further comprises means, responsive to the operation of said I/O controller meeans, for disabling the operation of said storing means during the operation of said I/O controller means.

5. A memory system for a virtual memory data processing system, said data processing system comprising a system bus comprised of data, address and control signal lines, said system bus having coupled thereto a central processing unit (CPU) including means for generating virtual memory addresses, the data processing system further comprising a virtual memory controller (VMC) coupled between said CPU and said address bus for translating said virtual memory addresses into physical memory addresses corresponding to storage locations within said memory system, said VMC including means for driving said address signal lines in accordance with said physical memory addresses, said data processing system further comprising an I/O controller for at least transferring data to and from at least one I/O device and said storage locations within said memory system, said memory system comprising:

a substrate including means for being physically and electrically coupled to said system bus;

one or more memory modules disposed upon said substrate and electrically coupled thereto, each of said memory modules comprising:

a plurality of read/write memory devices organized for storing a plurality of words of data, each of said words comprising one or more bytes, said words of data being partitioned into a predetermined number of blocks of data words, individual ones of said data words corresponding to one of said physical memory addresses, each of said blocks of data words corresponding to a range of said physical memory addresses; and a reference and change table (RCT) storage device comprising a predetermined number of storage locations at least equal in number to the predetermined number of blocks of data words, said RCT storage device comprising, at each of said storage locations, at least a first and a second bit of storage, said RCT storage device further comprising:

address decoding means having inputs coupled to said address signal lines and having an output responsive thereto for selecting one of said storage locations corresponding to one of said blocks;

means, coupled to said address decoding means output, for storing data in said first bit of storage for indicating an access to said corresponding block;

means, coupled to a system bus memory write (W*) signal line and to said address decoding means output, for storing data in said second bit of storage for indicating a write access to said corresponding block;

means, coupled to a system bus I/O signal line, for disabling the storing of data within said RCT storage device when said I/O signal is asserted, said I/O signal line being asserted during an operation of said I/O controller;

means, coupled to a test reference and change table (TRCT*) signal line and to said address decoding means output for outputting the contents of a specific storage location upon said system bus data lines; and means, coupled to a reset reference and change table (RRCT*) signal line and to said address decoding means output, for resetting the contents of a specific storage location within said RCT to indicate that a corresponding block of data has not been accessed.

6. A memory system as defined in claim 5 and further comprising:

a memory module control (MMC) means having inputs coupled to said system bus and a plurality of outputs coupled to said memory modules, said MMC outputs comprising:

a first signal group having signal lines coupled in common to all of said memory modules; and a plurality of second signal groups each having signal lines coupled to a respective one of said memory modules for selecting one of said memory modules for access.

7. A memory system as defined in claim 6 wherein said read/write memory devices are dynamic random access memory (DRAM) devices and wherein said first signal group comprises:

a plurality of multiplexed row and column address lines coupled to said DRAM devices and a row address strobe (RAS*) signal;

and wherein each of said second signal groups comprises a column address strobe (CAS*) signal for selectively activating only those DRAM devices on a respective one of said memory modules.

8. A memory system as defined in claim 7 wherein said address decoding means further comprises means for latching said row address signal lines.

9. A memory system as defined in claim 7 wherein each of said memory modules further comprises a predetermined number of DRAM devices for storing a plurality of error detection and correction data words each one of which is corresponding to one of said data words.

10. A memory system as defined in claim 5 wherein each one of said memory modules stores at least 1,048,576 data words each of which is comprised of four eight bit bytes of data, wherein said 1,048,576 data words are organized as 2048 blocks each having 512 words and wherein said predetermined number of storage locations within said RCT storage device is at least equal to 2048 words each of which is comprised of two bits.

11. A memory system as defined in claim 5 wherein each of said memory modules has a number of read/write memory devices which corresponds to a maximum number of bits of said data signal lines.

12. A memory system as defined in claim 5 wherein each of said memory modules has a number of read/write memory devices which corresponds to a portion of a maximum number of bits of said data signal lines.

13. A memory module for a data processing system having a read/write memory means organized as a plurality of blocks of physical data storage locations, said memory module comprising an interface means for coupling said module to said data processing system, said interface means comprising:

a plurality of memory means physical memory address signal lines;

a plurality of memory means control signal lines; and a plurality of memory means data lines having a least significant bit (LSB) and a most significant bit (MSB);

said memory module further comprising a reference and change table means having storage locations responsive to said physical memory address signal lines and to said control signal lines for recording an occurrence of an access to and a type of access to individual ones of said blocks of data storage locations, and wherein said interface means further comprises:
- a reset reference and change table signal line an assertion of which stores data within a selected one of said reference and change table means storage locations to indicate a nonaccessed condition, the selected one of the storage locations being specified by a state of the physical memory address signal lines;
- a test reference and change table signal line an assertion of which causes said reference and change table means to output the contents of a selected one of said storage locations, the selected one of the storage locations being specified by a state of the physical memory address signal lines; and
- means, responsive to an assertion of said test reference and change table signal line, for coupling a first and a second reference and change table means output signal line to predetermined ones of said memory means data lines.

14. A memory module as defined in claim 13 wherein said interface means further comprises a plurality of error detection and correction signal lines.

15. A memory module as defined in claim 14 wherein said interface means is coupled to a memory control unit, said memory control unit further being coupled to a data processing system bus.

16. A memory module as defined in claim 15 wherein said memory means data lines comprise 32 data lines.

17. A memory module as defined in claim 15 wherein said memory means data lines comprise 64 data lines.

18. A memory module as defined in claim 13 wherein said predetermined ones of of said memory means data lines are said MSB and a (MSB-1).

19. A virtual memory data processing system comprising:
- system bus means for transferring at least physical addresses and operation specifiers;
- a physical address source coupled to the system bus means for translating virtual addresses into physical addresses and providing the physical addresses and operation specifiers including data access specifiers to the system bus means; and
- system memory means connected to the system bus means for storing data words and responding to one of the physical addresses specifying one of the data words and one of the data access specifiers received on the system bus means by performing the data access specified by the data operation specifier on the data word specified by the physical address, the system memory means being organized into a plurality of blocks containing the data words, wherein said system memory means being partitioned into one or more storage means and each said storage means comprises means for storing the data words and reference and change table means that contains a record corresponding to each of the blocks, said reference and change table means responsive to the physical address and to the data access specifier for setting the record which corresponds to the block containing the data word to indicate an occurrence of an access to a data word in that block; and wherein:
- the system bus means further includes one or more data lines;
- the operation specifiers provided by the physical address source further include a test reference and change table operation specifier, and
- the reference and change table means is further responsive to the physical address and to the test reference and change table operation specifier to output to the data lines for reading by the physical address source the contents of the record corresponding to the block containing the data word specified by the physical address.

20. The virtual memory data processing system set forth in claim 19 and wherein:
- the data access specifiers include data modification operation specifiers specifying modification of the stored data and
- the reference and change table means further responds to the physical address and to one of the data modification operation specifiers by setting the record which corresponds to the block containing the data word specified by the physical address to indicate the occurrence of a data modification operation on a data word in that block.

21. The virtual memory data processing system set forth in claim 19 and wherein:
- the operation specifiers provided by the physical address source further include a reset reference and change table operation specifier, and
- the reference and change table means is further responsive to the physical address and to the reset reference and change table operation specifier to reset the record corresponding to the block containing the data word specified by the physical address.

22. The virtual memory data processing system set forth in claim 19 and wherein:
- for each of said storage means,
- said data words storing means responsive to internal addresses and internal control signals for storing the words and memory control means coupled between the system bus means, the reference and change table means and the data words storing means, the memory control means responding to a physical address by converting the physical address to a corresponding internal address specifying a block and a word within the block and to a data access specifier by activating a memory access internal control signal specifying a memory access and
- the reference and change table means includes a first reference and change table storage device coupled to the memory control means by internal address lines carrying the internal address specifying the block, the first reference and change table storage device storing the records in blocks specified in the internal addresses and further including a data input and a data write signal input;
- value providing means coupled to the data input means for providing a value indicating a memory access; and
- first write signal providing means coupled between the memory control means and the write signal input for providing the write signal to the write signal input in response to the memory access internal control signal;
- the first reference and change table storage device operating in response to the internal address specifying a given block and the memory access internal control signal to store the value indicating the memory access in the record in the first reference and change table storage device which corresponds to the block containing the data word being accessed.

23. The virtual memory data processing system set forth in claim 22 and wherein:
the data access specifiers include data modification operation specifiers specifying modification of the stored data;
the memory control means further responds to a data modification operation specifier by activating a memory write internal control signal specifying a memory write operation;
a second reference and change table storage device coupled to the memory control means by internal address lines carrying the internal address specifying the block, the second reference and change table storage device serving to store the records indicating occurrences of data modifications at the locations in the storage device specified by the addresses on the internal address lines and further including a data input coupled to the value providing means and a data write signal input; and
second write signal providing means coupled between the memory control means and the write signal input of the second reference and change table storage device for providing the write signal to the write signal input in response to the memory write internal control signal,
the second reference and change table storage device operating in response to the internal address specifying a given block and the memory write internal control signal to store the value indicating the data modification in the record in the second reference and change table storage device which corresponds to the block containing the data word being modified.

24. The virtual memory data processing system set forth in claim 23 and wherein:
the data processing system further includes an additional physical address source coupled to the bus which provides additional physical addresses which are not translated from virtual addresses;
the operation specifiers further include an additional source data operation specifier; the memory control means responds to the additional source data operation specifier by producing a signal indicating that the source of the address was the additional physical address source; and
the first and second reference and change table storage devices each further include an enable input for receiving an enable signal enabling each of the first and second reference change table storage devices to respond to the addresses on the internal address lines; and
the reference and change table means further includes means coupled between the memory control unit and the enable inputs for disabling the first and second reference and change table storage devices in response to the signal indicating that the source of the address was the additional physical address source,
whereby the memory reference and change table means does not indicate the occurrence of accesses to or modifications of data made by the additional physical address source.

25. The virtual memory data processing system set forth in claim 22 and wherein:
the operation specifiers produced by the physical address source further include a reset reference and change table operation specifier;
the memory control unit further responds to the reset reference and change table operation specifier by producing a reset reference and change table internal control signal;
the reference and change table means further includes reset reference and change table signal providing means coupled between the memory control means and the write signal input for providing the write signal to the write signal input in response to the reset reference and change table internal control signal; and
the value providing means further responds to the reset reference and change table signal by providing a value indicating no memory access;
the first reference and change table storage device operating in response to the internal address specifying a given block and the reset reference and change table internal control signal to store the value indicating no memory access in the record in the reference and change table storage device which corresponds to the block containing the data word specified by the physical address.

* * * * *

UNITED STATES PATENT AND TRADEMARK OFFICE
CERTIFICATE OF CORRECTION

PATENT NO. : 4,916,603

DATED : April 10, 1990

INVENTOR(S) : Robert P. Ryan and Kin L. Cheung

It is certified that error appears in the above-identified patent and that said Letters Patent is hereby corrected as shown below:

On the first page, the correct Assignee name should read --Wang Laboratories, Inc.--

On the first page, the filing date should read --March 18, 1988--.

In Col. 1, line 36 delete "predetermined" and insert --predefined--.

In Col. 2, line 27 delete "substantially" and insert --subsequently--.

In Col. 3, line 6 delete "locatins" and insert --locations--.

In Col. 3, line 10 delete "circuit" and insert --circuitry--.

In Col. 3, line 23 delete "circuit" and insert --circuitry--.

In Col. 5, line 33 delete "W*i" and insert --W*--.

In Col. 6, line 31 delete "of" and insert --or--.

In Col. 7, line 23 delete "memoy" and insert --memory--.

In Col. 7, line 51 delete "fame" and insert --frame--.

In Col. 9, line 66 delete "shon" and insert --shown--.

In Col. 10, line 58 delete "comprise" and insert --be comprised--.

In Col. 10, line 68 delete "D00-D62" and insert --D00-D63--.

UNITED STATES PATENT AND TRADEMARK OFFICE
CERTIFICATE OF CORRECTION

PATENT NO. : 4,916,603

DATED : April 10, 1990

INVENTOR(S) : Robert P. Ryan and Kin L. Cheung

It is certified that error appears in the above-identified patent and that said Letters Patent is hereby corrected as shown below:

In Col. 13, line 2 delete "meeans" and insert --means--.

In Col. 7, line 3 delete "(CAS)" and insert --(CAS*)--

Signed and Sealed this

Thirtieth Day of July, 1991

Attest:

HARRY F. MANBECK, JR.

*Attesting Officer*    *Commissioner of Patents and Trademarks*